United States Patent
Barton

(10) Patent No.: US 6,597,987 B1
(45) Date of Patent: Jul. 22, 2003

(54) METHOD FOR IMPROVING VEHICLE POSITIONING IN A NAVIGATION SYSTEM

(75) Inventor: Mark Barton, Schaumburg, IL (US)

(73) Assignee: Navigation Technologies Corp., Chicago, IL (US)

( * ) Notice: Subject to any disclaimer, the term of this patent is extended or adjusted under 35 U.S.C. 154(b) by 66 days.

(21) Appl. No.: 09/855,381

(22) Filed: May 15, 2001

(51) Int. Cl.$^7$ .................. G06G 7/78; G06F 15/50; G01S 5/02
(52) U.S. Cl. .................. 701/213; 701/200; 340/988
(58) Field of Search .................. 701/200, 208, 701/201, 207, 213, 224, 300; 340/988, 990, 995; 73/178 R

(56) References Cited

U.S. PATENT DOCUMENTS

| | | | |
|---|---|---|---|
| 4,114,437 A | * 9/1978 | Krogmann | 73/178 R |
| 4,999,783 A | * 3/1991 | Tenmoku et al. | 364/450 |
| 5,115,238 A | * 5/1992 | Shimizu et al. | 340/988 |
| 5,307,277 A | * 4/1994 | Hirano | 364/449 |
| 5,334,986 A | * 8/1994 | Fernhout | 342/357 |
| 5,345,382 A | * 9/1994 | Kao | 364/424.01 |
| 5,394,333 A | * 2/1995 | Kao | 364/450 |
| 5,508,931 A | * 4/1996 | Snider | 364/449 |
| 5,552,990 A | * 9/1996 | Ihara et al. | 364/444 |
| 6,169,958 B1 | 1/2001 | Nagasamy et al. | 701/213 |
| 6,192,312 B1 | 2/2001 | Hummelsheim | 701/118 |
| 6,236,937 B1 | 5/2001 | Kohli | 701/213 |
| 6,246,363 B1 | 6/2001 | Yung et al. | 342/351.14 |
| 6,263,281 B1 | 7/2001 | Yamamoto et al. | 701/215 |
| 6,397,147 B1 | 5/2002 | Whitehead | 701/213 |
| 2002/0055819 A1 | 5/2002 | Shimizu et al. | 701/241 |

\* cited by examiner

*Primary Examiner*—Tan Q. Nguyen
*Assistant Examiner*—Dalena Tran
(74) *Attorney, Agent, or Firm*—Frank J. Kozak; Jon D. Shutter; Lawrence M. Kaplan

(57) ABSTRACT

A method implemented on a navigation system in a vehicle for determining the position of the vehicle relative to a road network. The navigation system uses a geographic database that contains data that represent positions of roads upon which the vehicle travels. Using the output from a GPS system, and optionally outputs from other sensors, the navigation system matches the positions of the vehicle to the locations of the roads represented by the data contained in the geographic database. Upon detecting an event from which the position of the vehicle with respect to the roads represented by the data contained in the geographic database can be determined with a relatively high degree of accuracy, a correction factor is determined. The correction factor is an offset (i.e., a distance and direction) of the GPS position reported during the event to the known-to-be-highly-accurate position. The correction factor is then used to adjust subsequently obtained GPS readings for a limited period of time, i.e., while the same atmospheric conditions apply. This period of time may be 10–20 minutes.

19 Claims, 3 Drawing Sheets

METHOD FOR IMPROVING VEHICLE POSITIONING IN A NAVIGATION SYSTEM

BACKGROUND OF THE INVENTION

The present invention relates to vehicle navigation systems and more particularly, the present invention is an improvement that relates to the use of GPS in a navigation system to determine the position of a vehicle relative to a road network represented by data contained in a geographic database used by the navigation system.

In-vehicle navigation systems provide a variety of useful features to end users (i.e., the drivers and/or passengers of the vehicles in which the navigation systems are installed). Included among the features that are provided by some in-vehicle navigation systems are route calculation, route guidance, emergency roadside services, electronic yellow pages, and so on.

Some of the features provided by in-vehicle navigation systems require that the position of the vehicle be determined. There are several considerations related to determining the position of the vehicle. For example, a GPS system may be used to obtain the geographic coordinates of the vehicle. However, the geographic coordinates only indicate the position of the vehicle relative to the surface of the earth. For some of the features provided by in-vehicle navigation systems, a means is required to determine the vehicle position relative to the road network which is represented by the geographic data used by the in-vehicle navigation system. In other words, if the vehicle is located on a road segment, a means is required to identify the road segment, and optionally the position and direction along the road segment. Once the vehicle position is determined relative to the road segments in the geographic area, programming in the in-vehicle navigation system can be used to provide various features, such as determining a route to a desired destination, providing maneuvering instructions for reaching the destination, identifying the closest restaurant or gas station relative to the vehicle position, displaying a map of the area around the vehicle, and so on.

Some of the features provided by in-vehicle navigation systems require that the vehicle position be updated continuously in real time as the vehicle is driven along roads in a geographic region. For example, in some navigation systems, a map display feature may continuously update a graphic display of a map of the area through which the vehicle is traveling on a display of the navigation system. Also, a route guidance function provided by some navigation systems may provide maneuvering instructions to the driver as the vehicle approaches the location at which the maneuver is required. These kinds of functions require that the data identifying the vehicle position be updated continuously or regularly as the vehicle moves in a geographic region.

There are prior methods for determining a vehicle position relative to a road network represented by data in a geographic database. However, a need for improved methods continues to exist.

Prior to May 1, 2000, the accuracy of GPS systems used in vehicle navigation systems was limited due to an intentionally included error, referred to as "Selective Availability." Although GPS systems were subject to other kinds of errors (such as atmospheric errors), the error due to Selective Availability was substantially greater than the other kinds of errors. Accordingly, the other kinds of errors were difficult to detect in the presence of the Selective Availability error. Furthermore, there was little or no benefit to addressing these other errors because the error due to Selective Availability limited the accuracy of GPS systems anyway.

Since the Selective Availability error has been removed, GPS systems are able to determine a position of an object, such as a vehicle, with greater accuracy. However, there continues to be a need to determine a vehicle position with still greater precision and accuracy.

SUMMARY OF THE INVENTION

To address these and other objectives, the present invention comprises a method implemented by a navigation system in a vehicle for determining the position of the vehicle relative to a road network. The navigation system uses a geographic database that contains data that represent positions of roads upon which the vehicle travels. Using the output from a GPS system, and optionally outputs from other sensors, the navigation system matches the positions of the vehicle to the locations of the roads represented by the data contained in the geographic database. Upon detecting an event from which the position of the vehicle with respect to the roads represented by the data contained in the geographic database can be determined with a relatively high degree of accuracy, a correction factor is determined. The correction factor is an offset (i.e., a distance and direction) of the GPS position reported during the event to the known-to-be-highly-accurate position. The correction factor is then used to adjust subsequently obtained GPS readings for a limited period of time, i.e., while the same atmospheric conditions apply. This period of time may be 10–20 minutes. Upon detection of another event from which the position of the vehicle with respect to the roads represented by the data contained in the geographic database can be determined with a relatively high degree of accuracy, a new correction factor is determined and used.

DETAILED DESCRIPTION OF THE PRESENTLY PREFERRED EMBODIMENTS

I. OVERVIEW OF NAVIGATION SYSTEM

Figure 1:
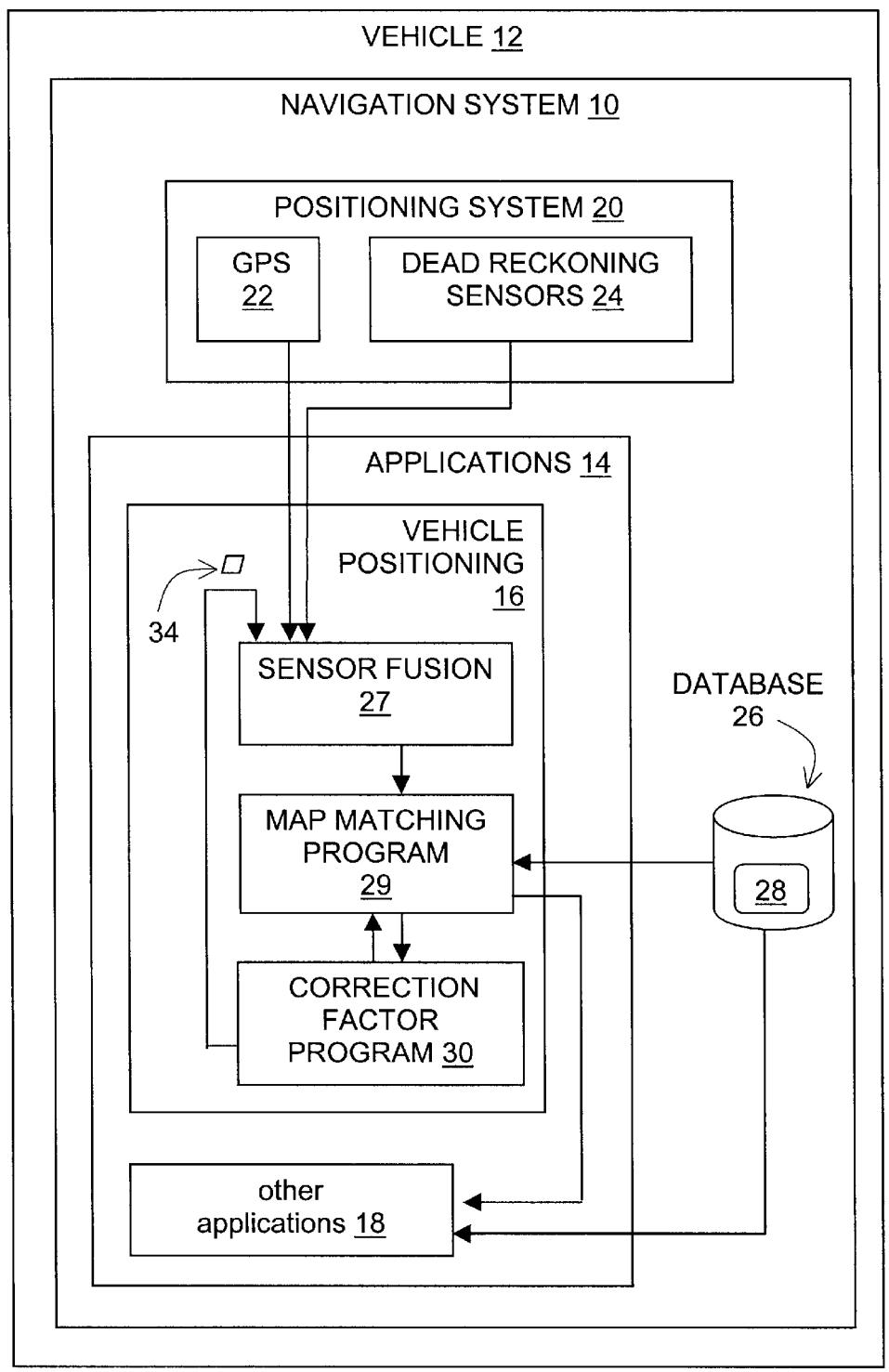
FIG. 1 is a block diagram of a navigation system installed in a vehicle.

Referring to FIG. 1, a navigation system 10 is installed in a vehicle 12. The navigation system 10 is a combination of hardware and software. The navigation system 10 includes software applications 14. Included among the software applications 14 is a vehicle positioning application 16. In addition to the vehicle positioning application 16, the navigation system 10 may include other applications 18. The other applications 18 may include route calculation, route guidance, map display, geocoding, etc.

The vehicle positioning application 16 receives outputs from a positioning system 20. The positioning system 20 includes a GPS system 22. In this embodiment, Selective Availability has been turned off. In this embodiment, the accuracy of the vehicle's GPS reading is approximately ±10–20 meters. The positioning system 20 also includes sensors for dead-reckoning 24. The dead reckoning sensors 24 may include inertial sensors, an accelerometer, a speed pulse sensor, a differential wheel speed sensor, a compass, etc.

The vehicle positioning application 16, as well as the other applications 18, use a geographic database 26. The geographic database 26 includes data 28 that represent the roads in the geographic area in which the vehicle 12 is located. The geographic data 28 that represent the roads include information about the positions of the roads, the names of the roads, the speed limits along the roads, etc. In this embodiment, the data contained in the geographic database 26 that indicate the positions of the roads have an accuracy of approximately ±1–2 meters. The geographic database 26 may include information about other kinds of geographic features, as well as other kinds of information.

The vehicle positioning application 16 includes a sensor fusion function 27. The sensor fusion function 27 combines the output from the GPS system 22 and the output from the dead-reckoning sensors 24 to provide an estimate of the vehicle's position. The vehicle positioning application 16 includes a map matching function 29. The map matching function 29 uses the output from the sensor fusion function 27 and data from the geographic database 26 to determine an estimate of the position of the vehicle along a road represented by the data contained in the geographic database 26, i.e., where the vehicle is located along a road. This information from the vehicle positioning application 16 is used by the other applications 18 in the navigation system.

Methods for vehicle positioning using the outputs of GPS and dead-reckoning sensors are known. Methods for vehicle positioning are disclosed in U.S. Pat. No. 6,192,312, the entire disclosure of which is incorporated by reference herein. The embodiments disclosed in the present specification are not limited to the methods for positioning described by U.S. Pat. No. 6,192,312, and any other suitable method may be used.

II. DETERMINATION OF CORRECTION FACTOR

Continuing with reference to FIG. 1, included among the software applications 14 in the navigation system 10 is a correction factor program 30. The correction factor program 30 operates with the vehicle positioning application 16. The correction factor program 30 may be part of the vehicle positioning application 16 or alternatively, the correction factor program 30 may be a separate application.

The correction factor program 30 determines a correction factor 34. The correction factor 34 is used by the vehicle positioning application 16 to adjust and modify the positions determined by the GPS system 22.

In order to determine the correction factor, the correction factor program 30 requires that the position of the vehicle be determined with a relatively high degree of accuracy and confidence. Accordingly, the correction factor program 30 monitors operation of the vehicle positioning application for event patterns from which the vehicle position can be determined with a high degree of accuracy and confidence.

There are several event patterns that can be used for this purpose. One of these event patterns is a well-defined turn. As stated above, the data contained in the geographic database 26 that indicate the positions of the roads have an accuracy of approximately ±1–2 meters whereas the accuracy of the GPS system is approximately ±10–20 meters. Normally, using this information, the vehicle positioning application 16 determines the position of the vehicle with respect to the data that represent the roads within the accuracy of the GPS system (i.e., approximately ±10–20 meters). However, if the vehicle makes a well-defined turn, there is an event during which the position of the vehicle can be matched to an exact position represented by the geographic database (i.e., an intersection corresponding to the well-defined turn). Thus, when the vehicle makes a well-defined turn, the position of the vehicle can be determined with the accuracy of the geographic database (i.e., approximately ±1–2 meters).

When the correction factor program 30 detects an event pattern, the correction factor program 30 compares the high accuracy position associated with the event pattern with the GPS position reported by the GPS system. Because the position of the vehicle is known with a relatively high degree of accuracy during an event pattern, the distance by which the reported GPS position varies from the known-to-be-highly-accurate position is attributed to atmospheric-related errors.

Then, the correction factor program 30 determines a correction factor 34. The correction factor 34 is a pair of integers: a latitude offset and a longitude offset. In this embodiment, these are both measured in centimeters. These offsets can each be negative or positive. This correction factor is the difference between the known position (from the matching to the geographic database) and the GPS reading.

The correction factor 34 determined by the correction factor program 30 takes into account several kinds of errors. Some of these errors include orbital errors, ionosphere errors, troposphere errors, and satellite clock errors. Some of the errors taken into account by the correction factor program are atmospheric-related errors. It has been observed that some of these errors, including the atmospheric-related errors, tend to be relatively highly correlated for approximately 10 to 20 minutes (or more). However, after approximately 10 to 20 minutes, these errors tend to change and then are not highly correlated. Accordingly, a correction factor determined by the correction factor program 30 is valid for only about 10 to 20 minutes. During the period of time in which the correction factor is valid, it is used to adjust the position reported by the GPS system 22.

Although a correction factor may be used for 10–20 minutes, it is preferable not to wait until a correction factor become stale before calculating a new correction factor. Instead, according to the preferred embodiment, after calculating a correction factor, the correction factor program immediately resumes monitoring the vehicle travel path in order to detect another event pattern from which the vehicle location can be determined with a high degree of accuracy so that a new correction factor can be calculated. One reason why it is preferable to determine a new correction factor even though a prior correction factor is still valid is that, since the accuracy of a correction factor deteriorates with time, a freshly obtained correction factor would be expected to be at least slightly superior to a correction factor that is even a few minutes old. Another reason why it is preferable to attempt to determine a new correction factor immediately is that determination of a correction factor requires that the vehicle traverse a location at which an event pattern can be detected. It is possible that the vehicle can travel several minutes or more before traversing a location at which a new event pattern can be detected. Therefore, it is preferable to determine a new correction factor at every opportunity, i.e., whenever an event pattern is detected. Accordingly, the correction factor program 30 continues monitoring the vehicle travel path in order to detect an event pattern so that the vehicle position with respect to the road network can be determined with a high degree of accuracy, thereby enabling a new correction factor to be determined.

When the new correction factor is obtained, it is used to adjust the position reported by the GPS system 22 until a fresher correction factor can be obtained. If a new correction factor is not obtained before the prior correction factor is more than 10–20 minutes old, no correction factor is used until a new one can be obtained.

Operation

Figure 2:
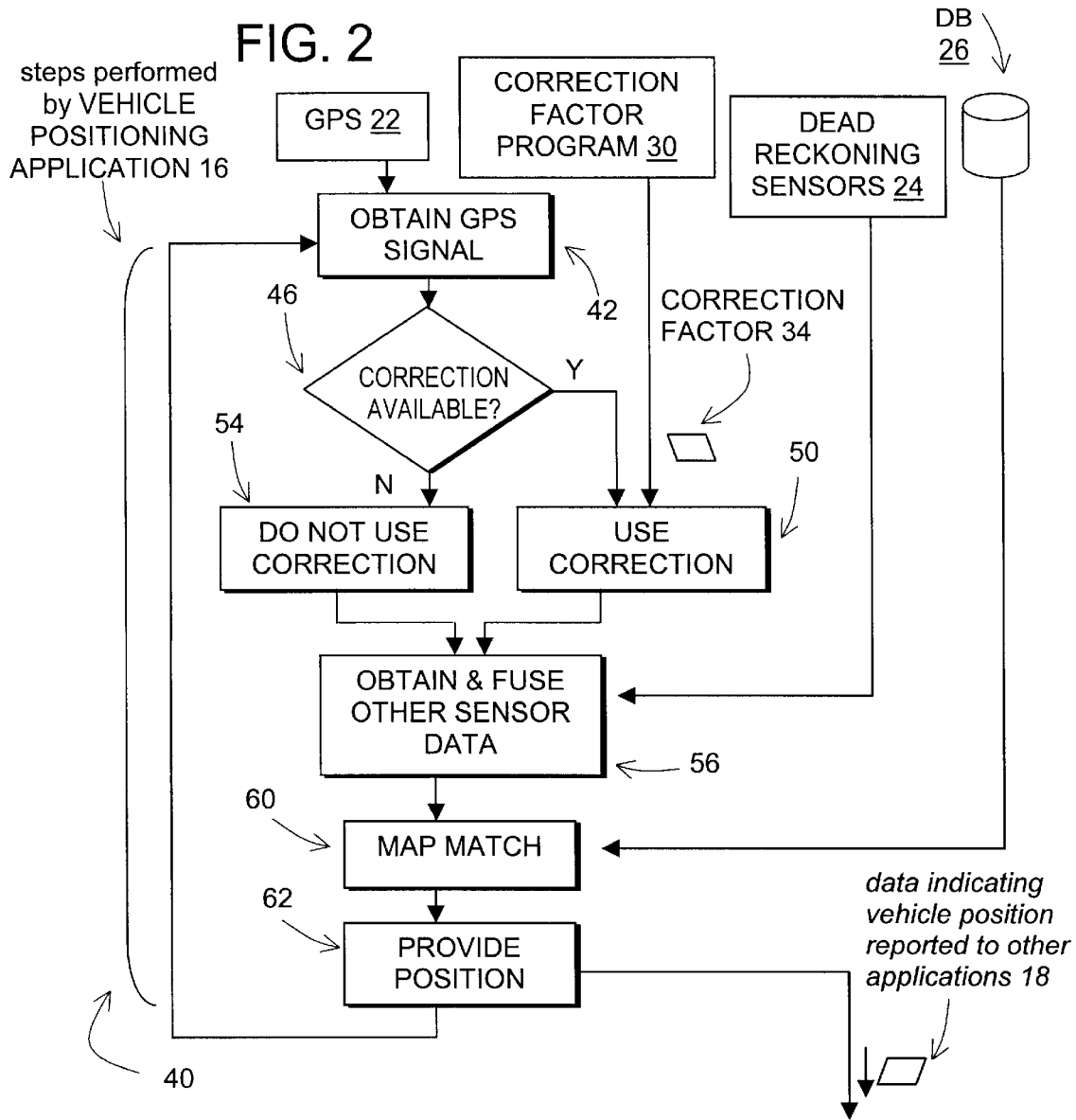
FIG. 2 is a flowchart that illustrates operation of the vehicle positioning application of FIG. 1.
Figure 3:
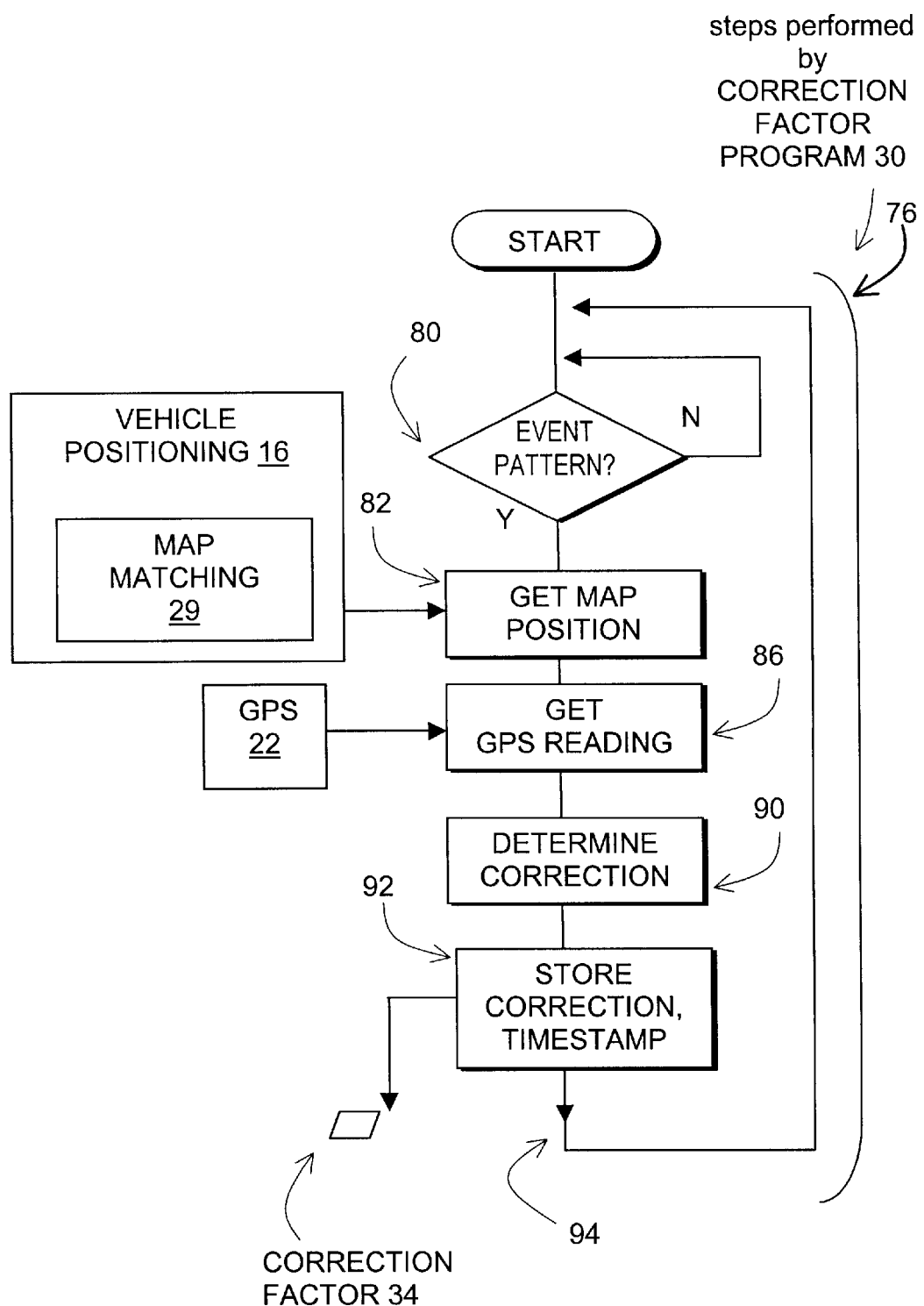
FIG. 3 is a flowchart that illustrates operation of the correction factor program of FIG. 1.

FIGS. 2 and 3 are flowcharts that illustrate some of the steps included in processes performed by the vehicle positioning application 16 and correction factor program 30 of FIG. 1. The processes shown in FIGS. 2 and 3 are exemplary and one of skill in the art will appreciate that there are suitable variations of these processes.

In FIG. 2, a process 40 performed by the vehicle positioning application 16 begins by obtaining the output of the GPS system 22 (Step 42). The process 40 checks whether a correction factor 34 is available (Step 46). If a correction factor is available, the correction factor is used (Step 50). The correction factor is used by adjusting the reported GPS position by the offset of the correction factor. If a correction factor is not available, the reported GPS position is not adjusted (Step 54).

Then, a step is performed that combines (i.e., fuses) the GPS (adjusted or not adjusted) reading with the outputs of the dead reckoning sensors (Step 56). Using this combined position, the location of the vehicle is matched to the road network represented by the geographic database using the map matching function (29 in FIG. 1) of the vehicle positioning application (Step 60). This information is provided to and used by the other applications 18 in the navigation system (Step 62). Then, the process 40 continues by looping back to the step (i.e., Step 42) in which the GPS signals are obtained.

FIG. 3 shows some of the steps in a process 76 performed by the correction factor program 30. In this embodiment, the correction factor program 30 runs as a separate process from the steps described in FIG. 2. Referring to FIG. 3, the correction factor process 76 includes a step that monitors the travel path of the vehicle on the road network in order to detect an event pattern (Step 80). If an event pattern is not detected, the process 76 continues to monitor the travel path of the vehicle until an event pattern is detected. When an event pattern is detected, the position of the vehicle corresponding to the event is obtained (Step 82). This position is obtained from the map matching process (29 in FIG. 1) in the vehicle positioning application 16 and corresponds to the location (from the geographic database 26) of the road position where the vehicle was located when the event occurred. The GPS reading corresponding to the event is also obtained (Step 86). Then, a correction factor 34 is determined (Step 90). The correction factor 34 is an offset (e.g., distance and direction) between the GPS position corresponding to the event and the map position corresponding to the event. The correction factor and the time of the event are then stored (Step 92) and the process 76 continues by looping back to the step (i.e., Step 80) in which the vehicle path is monitored for an event pattern.

Referring again to the process 40 performed by the vehicle positioning application 16, when the step (i.e., Step 46) is performed in which a determination is made whether a correction factor is available, the correction factor determined by the correction factor program (Step 90 in FIG. 3) is used.

Another process (not shown) monitors the age of (and possibly other conditions relating to) the correction factor stored by the correction factor program. If the correction factor become stale (e.g., more than 10–20 minutes old), the process deletes the correction factor thereby preventing the vehicle positioning application from using a stale correction factor (Steps 46 and 54 in FIG. 2).

III. ALTERNATIVES

A. Other Event Patterns (1). Travel on Straight North-South or East-West Roads

As mentioned above, there are certain event patterns that can occur while a vehicle is traveling along a road from which the position of the vehicle can be determined with a high degree of accuracy and confidence. A well-defined turn is one such event. Other events from which a highly accurate vehicle position can be determined include traveling in a straight line for a duration of time or distance in one dimension and traveling in a straight diagonal for a duration of time or distance.

Many roads, or portions of roads, run exactly (or very nearly) east-west or north-south. Travel by a vehicle along these types of roads can be used as event patterns by the correction factor program to determine the position of a vehicle with a high degree of accuracy. If the vehicle is being driven along such a road, then either the latitude or the longitude stays constant for a period of several seconds. For example, assume that the vehicle is traveling on an east-west road. In this case, the latitude of the vehicle stays constant. Using this travel as an event pattern, the correction factor program determines a partial correction factor. The partial correction factor is for latitude only. This partial correction factor can be obtained because the latitude of the vehicle is known precisely, using map-matching. The longitude, however, may vary within perhaps 15 meters.

Similarly, if the vehicle is detected to be traveling on a north-south road, the longitude of the vehicle stays constant. The correction factor program determines a partial correction factor using the longitude of the north-south road. The latitude may vary however.

Using this information, the correction factor program monitors whether the vehicle is located on a straight road that extends either directly north-south or directly east-west. If the vehicle can be determined to be on such a road, then a correction factor can be determined for the dimension (i.e., either latitude or longitude) for which the vehicle's position is known with a high degree of accuracy. Then, this correction factor is used to adjust subsequently obtained GPS readings for a period of time (e.g., 10–20 minutes), as described above.

(2). Driving Straight Diagonals

The previously described alternative applies when the vehicle is being driven exactly east-west or north-south. There is a variation of this alternative that applies for travel in any direction, as long as the vehicle is travelling straight for approximately at least 40 meters or so.

Along a straight line of travel, the mathematical relationship between latitude and longitude is defined as follows:

$$y=ax+b \tag{1}$$

where x is longitude, y is latitude, and a and b are constants. This is the equation of the straight line that passes through that straight section of road. This equation can be determined from the geographic database, without any use of GPS. GPS is accurate enough to determine that a vehicle is somewhere along this 40-meter stretch of straight road, i.e., the vehicle is on the line y=ax+b. Thus, the values of a and b are known.

Assume that a GPS reading (X1, Y1) is obtained along this road. This provides an X1 (longitude) and Y1 (latitude) from GPS. If the map were perfect and the GPS values were exact, then they would exactly fit into the equation y=ax+b. But these values usually will not quite match. If the geographic database is highly accurate, all the error can be assumed to result from GPS inaccuracy. Thus, the following relationship applies.

$$(Y1+Ey)=a*(X1+Ex)+b \quad (2)$$

where Ex and Ey are the longitude and latitude components of the correction factor. In other words, if the correction factor (which has not yet been determined) could be applied to the GPS reading, then the adjusted GPS reading would fall along the line y=ax+b.

Now assume that direction of travel of the vehicle is changed and the vehicle travels at least 40 meters in a straight line on a different road, or part of the same road. Another GPS reading (X2, Y2) is obtained somewhere along that 40-meter stretch of straight road. The following relationship applies:

$$(Y2+Ey)=c*(X2+Ex)+d \quad (3)$$

At this point, these relationships are used to solve for Ex and Ey.

A correction factor can now be calculated. Determination of a correction factor according to this alternative works if the two straight roads are not parallel.

B. Change in the Group of Satellites

As stated above, some of the errors that are accounted for by the correction factor program relate to atmospheric conditions. These atmospheric conditions affect the reception of the satellite signals that are used by a GPS system to determine a position of a vehicle. However, atmospheric conditions may vary throughout a region. Accordingly, a correction factor that is calculated when a GPS system uses signals from a collection of satellites in one part of the sky may not be valid if the GPS system begins using signals from a different collection of satellites some of which are located in another part of the sky. Thus, a correction factor tends to be associated with the specific group of satellites used when the correction factor is calculated.

The satellites that are in use by the navigation system can change at any time, either because a satellite moves further away, or because it is blocked, or because a satellite at a better angle comes into view. When the group of satellites used by a navigation system changes, it may be appropriate to delete the existing correction factor and determine and use a new correction factor.

Accordingly to another alternative embodiment, the same correction factor may be used even if the satellites used by a GPS system changes.

C. Averaging of Correction Factors

According to another alternative embodiment, the results of the correction factor program may be improved by averaging several recently obtained correction factor values. These correction factors may be weighted based on how recently they were obtained. The appropriate weights may be determined from an analysis of the auto-correlation patterns.

Another alternative is to use all correction factors calculated in the last 5 or 10 minutes and to weight them equally.

D. Beginning of Trip

A correction factor may not be available at the beginning of a trip (e.g., during the first several minutes that a navigation system is in operation) because the vehicle may not yet have traveled past a location at which the vehicle position can be determined with a high degree of accuracy (i.e., an event pattern). However, this consideration is offset to some degree because there tend to be relatively more turns (per mile) at the beginning of a journey than in the middle. Some of these turns may qualify as event patterns for determining a correction factor.

According to another alternative, a best estimate for a corrected vehicle position (i.e., the latitude/longitude location of the vehicle with the most recently obtained correction factor applied) is stored periodically, e.g., every second or so. Then, when a car is parked and the navigation system is turned off, the corrected vehicle position is stored. When the vehicle is started again later, the navigation system checks immediately to determine if the vehicle is still in the same position (within the GPS accuracy of 10–20 meters). If so, the saved corrected vehicle position is read out and used. Then, the correction factor program immediately calculates a new atmospheric correction factor based on the difference of the current GPS reading and the stored corrected vehicle position.

According to this alternative, the navigation system is not shut off until the engine is shut off. When the vehicle is started again, the navigation system is restarted and obtains a GPS reading before the vehicle starts moving.

E. Lane Determination

According to some of the embodiments described above, it may be helpful to know precisely where the vehicle is in relation to the geographic database at the time that the correction factor is calculated. For instance, on a road with two lanes in each direction, it would be helpful to know which of the two lanes the vehicle is in.

IV. ADVANTAGES

The embodiments described above provide for determining a position of a vehicle more precisely than prior methods. The embodiments help navigation systems function better in every respect. Route guidance explications can be more precise. Displays showing remaining distance to an intersection can be more precise. With the embodiments it may become possible to accurately detect whether a vehicle is on a frontage road or on a main road which is parallel to the frontage road but a few meters away.

It is intended that the foregoing detailed description be regarded as illustrative rather than limiting and that it is understood that the following claims including all equivalents are intended to define the scope of the invention.

I claim:

1. A method for determining a position of a vehicle relative to a road network, the method comprising:

matching a position of the vehicle to locations of roads represented by data contained in a geographic database;

detecting an event pattern by which the position of the vehicle with respect to the roads represented by data contained in the geographic database can be determined with a relatively high degree of accuracy;

determining a correction factor by which an output from a GPS system varied from the position of the vehicle during the event pattern;

storing multiple correction factors during a limited period of time;

using said stored multiple correction factors to continuously determine a new correction factor; and thereafter, applying the new correction factor to subsequent outputs of the GPS system.

2. The method of claim 1 wherein the limited period of time is approximately 10–20 minutes.

3. The method of claim 1 further comprising:

after applying the new correction factor, determining another new correction factor by performing the steps of matching, detecting, and determining again.

4. The method of claim 1 wherein the correction factor is a latitude and longitude offset.

5. The method of claim 1 wherein the event pattern is a well-defined turn.

6. The method of claim 1 wherein the event pattern is traveling in a straight line for a defined distance.

7. The method of claim 1 wherein the event pattern is traveling on a road that extends in a direct east-west or direct north-south direction.

8. The method of claim 1 further comprising:

upon detecting that the GPS system is obtaining signals from a different collection of satellites than those whose signals were being used when the new correction factor was determined, determining another new correction factor.

9. The method of claim 1 further comprising:

storing data that indicate a corrected position of the vehicle when the vehicle is parked; and when the vehicle is started again, using the data that indicate the corrected vehicle position to adjust a GPS reading obtained when the vehicle is started.

10. The method of claim 1 wherein the event pattern comprises traveling in a straight line in a first direction and then traveling in a straight line in a second direction, wherein the first direction and the second direction are not parallel to each other.

11. The method of claim 1 further comprising:

weighting those more recently obtained of said multiple correction factors relative to those less recently obtained of said multiple correction factors.

12. The method of claim 1 further comprising:

averaging the multiple correction factors.

13. The method of claim 1 wherein said GPS system receives signals without the Selective Availability error.

14. A method implemented with a navigation system in a vehicle for determining a position of the vehicle relative to a road network, wherein the navigation system uses a GPS system and a geographic database containing data that represent positions of roads upon which the vehicle travels, and wherein the method is implemented in the absence of Selective Availability error, the method comprising:

matching a position of the vehicle to locations of roads represented by data contained in the geographic database;

detecting an event by which the position of the vehicle with respect to the roads represented by data contained in the geographic database can be determined with a relatively high degree of accuracy;

determining a correction factor by which an output from the GPS system varied from the position of the vehicle during the event pattern;

storing multiple correction factors during a limited period of time;

using said stored multiple correction factors to continuously determine a new correction factor; and thereafter, applying the new correction factor to subsequent outputs of the GPS system.

15. The method of claim 14 wherein the limited period of time is approximately 10–20 minutes.

16. A feature implemented by a software application on a navigation system installed in a vehicle comprising:

a first program routine that monitors roads upon which the vehicle is traveling for an event at which a position of the vehicle can be accurately matched to a specific location along a road represented by data contained in a geographic database used by the navigation system;

a second program routine that determines a difference between a GPS reading obtained when the event occurred and the specific location along a road and stores multiple correction factors during a period of time;

a third program routine that uses said multiple correction factors to continuously determine a new correction factor; and a fourth routine that applies the new correction factor to subsequently obtained GPS readings.

17. The invention of claim 16 further comprising:

a fifth routine that stores data indicative of a corrected vehicle position upon parking of the vehicle.

18. The invention of claim 17 wherein the fifth routine determines a second new correction factor upon the vehicle being restarted, wherein the second new correction factor represents a difference between the corrected vehicle position when the vehicle was parked and a new GPS reading obtained when the vehicle was restarted.

19. The invention of claim 17 wherein the fifth routine checks, when the vehicle is restarted, whether the vehicle has been moved since being parked.

* * * * *